(12) United States Patent
Mansker

(10) Patent No.: US 11,084,589 B2
(45) Date of Patent: Aug. 10, 2021

(54) CUP HOLDER ASSEMBLY FOR SMALL AIRCRAFT

(71) Applicant: Shane Mansker, Dexter, MO (US)

(72) Inventor: Shane Mansker, Dexter, MO (US)

( * ) Notice: Subject to any disclaimer, the term of this patent is extended or adjusted under 35 U.S.C. 154(b) by 0 days.

(21) Appl. No.: 16/104,358

(22) Filed: Aug. 17, 2018

(65) Prior Publication Data

US 2020/0055604 A1 Feb. 20, 2020

(51) Int. Cl.
*B64D 11/06* (2006.01)
*B60N 3/10* (2006.01)
*B64D 13/06* (2006.01)

(52) U.S. Cl.
CPC .......... *B64D 11/0638* (2014.12); *B60N 3/103* (2013.01); *B64D 2013/0629* (2013.01)

(58) Field of Classification Search
CPC ........ B64D 11/0638; B64D 2013/0629; B60N 3/103; B60N 3/104; B60N 3/10; F25D 2303/0845; F25D 2303/0844; F25D 2303/0841; F25D 31/002; F25E 31/007
USPC ............ 62/457.5, 457.1, 243–244, 377, 441, 62/457.4, 458; 248/311.2
See application file for complete search history.

(56) References Cited

U.S. PATENT DOCUMENTS

| | | | | |
|---|---|---|---|---|
| 1,728,636 A | * | 9/1929 | Stewart | F25D 3/08 62/373 |
| 3,395,550 A | * | 8/1968 | Dungan | F25D 3/08 62/400 |
| 3,410,337 A | * | 11/1968 | Priest | B60N 3/104 165/41 |
| 3,505,830 A | * | 4/1970 | Koerner | B60N 3/103 62/337 |
| 3,572,054 A | * | 3/1971 | Curcio | F25D 31/002 62/390 |
| 3,591,194 A | * | 7/1971 | Vega | F25D 3/06 280/79.2 |
| 3,757,851 A | * | 9/1973 | Marble | B60H 1/00592 165/41 |
| 3,842,981 A | * | 10/1974 | Lambert | A47G 29/08 211/74 |
| 3,916,639 A | * | 11/1975 | Atkinson | B60H 1/00592 62/239 |
| 4,213,309 A | * | 7/1980 | Pifer | F25D 11/00 62/332 |
| 4,478,052 A | * | 10/1984 | McDowell | B60H 1/247 62/244 |
| 4,543,471 A | * | 9/1985 | Anderson | A47J 39/02 219/386 |
| 4,543,798 A | * | 10/1985 | Page | B60N 3/103 220/524 |
| 4,637,222 A | * | 1/1987 | Fujiwara | B60N 3/103 62/244 |
| 4,653,289 A | * | 3/1987 | Hodgetts | B60N 3/104 62/239 |

(Continued)

*Primary Examiner* — Christopher Garft
(74) *Attorney, Agent, or Firm* — Sandberg Phoenix & von Gontard, P.C.

(57) ABSTRACT

A cooled cup holder provides for a cooled beverage container that is connectable to a vehicle's air conditioning system to maintain a drink cold. The assembly can additionally be provided with a second compartment which can keep a snack or sandwich cool. The cup holder assembly can be adapted to be suspended from the map pocket panel, or can be provided with its own map pocket, in which case, the assembly will replace the airplane's map pocket.

17 Claims, 9 Drawing Sheets

(56) References Cited

U.S. PATENT DOCUMENTS

| | | | | | |
|---|---|---|---|---|---|
| 4,779,831 | A | * | 10/1988 | Anderson | B60N 3/103 248/205.2 |
| 4,852,843 | A | * | 8/1989 | Chandler | B60N 3/103 248/311.2 |
| 4,892,137 | A | * | 1/1990 | Bibik, Jr. | B60N 3/103 165/41 |
| 4,892,138 | A | * | 1/1990 | Bibik, Jr. | B60N 3/104 165/41 |
| 4,916,923 | A | * | 4/1990 | Adams | A45C 11/20 62/457.1 |
| 5,165,646 | A | * | 11/1992 | Gewecke | B60N 3/103 165/80.1 |
| 5,203,833 | A | * | 4/1993 | Howell | B60H 1/247 165/41 |
| 5,355,694 | A | * | 10/1994 | Morrow | B60N 3/104 62/244 |
| 5,588,480 | A | * | 12/1996 | Armanno, Sr. | B60H 1/00271 165/300 |
| 6,533,232 | B1 | * | 3/2003 | Aggeler | B60N 3/103 220/737 |
| 6,560,983 | B1 | * | 5/2003 | Schimmeyer | B60N 3/103 248/311.2 |
| 6,895,778 | B1 | * | 5/2005 | Ackerman | F25D 3/06 62/457.7 |
| 10,112,545 | B1 | * | 10/2018 | Gaskins | B60R 9/065 |
| 10,145,592 | B2 | * | 12/2018 | Liptak | B60N 3/00 |
| 2006/0016213 | A1 | * | 1/2006 | Al Rashidi | B60H 1/00592 62/457.9 |
| 2008/0178623 | A1 | * | 7/2008 | Cunningham | B60H 1/00592 62/244 |
| 2008/0245941 | A1 | * | 10/2008 | Schimmeyer | B60N 3/103 248/311.2 |
| 2018/0099599 | A1 | * | 4/2018 | Karrer | B60H 1/00492 |

* cited by examiner

CUP HOLDER ASSEMBLY FOR SMALL AIRCRAFT

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The subject matter herein relates generally to a temperature control system for a container. More specifically, it relates to a passive cooling system in, for example, crop dusting aircraft to keep, for example, beverages and snacks cool.

Small agricultural aircrafts, often referred to as crop dusters or top dressers, are used in the aerial application of pesticides or fertilizers. Such aircrafts are small, simple, and rugged. Aircraft of this type are often without cup holders, and if one is provided it generally only has simple holding capabilities. Additionally, given the small size of such aircraft and the amount of time many people spend in such tight vicinities, the cabin often reaches high temperatures. As a result, any beverages the pilot brings with him or her become warm.

As a result, there is a demand for a cup holder assembly that is configured to keep a beverage cool. Also, given the small space of such aircraft such an assembly would have to fit within those tight constraints.

BRIEF SUMMARY OF THE INVENTION

The cup holder assembly disclosed hereinafter provides for a cooled beverage container that is coupled with an agricultural aircraft's air conditioning system to maintain a drink cold. The assembly can additionally be provided with a second compartment which can keep a snack cool. The cup holder assembly can be adapted to be suspended from the map pocket panel, or can be provided with its own map pocket, in which case, the assembly will replace the airplane's map pocket.

Briefly stated, the cup holder assembly comprises a housing comprising a front wall, a back wall, side walls, a bottom and a top defining a beverage receiving area. The top defines an opening into the beverage receiving area. A support positioned within beverage receiving area to support a beverage container above the bottom of the housing. Additionally, the housing includes an air inlet; and an air outlet, whereby, cooled air which enters through the inlet will circulate around a beverage container received in the housing, and will then exit the housing through the air outlet.

In accordance with an aspect of the assembly, the assembly includes a cover on the top of the housing and which is movable between a closed position in which the opening to the beverage receiving area is closed and an open position in which the opening is accessible such that a beverage container can be placed in or removed from the beverage receiving area. The cover can be insulated.

In accordance with an aspect of the assembly, the assembly further comprises a second compartment which is defined at least in part by a wall of the housing and by a second cover; the second cover being movable between a closed position and an opened position. The assembly can include an opening in the wall separating the second compartment from the beverage receiving area, such that air can flow from the beverage receiving compartment into the second compartment.

In accordance with an aspect of the assembly, the air outlet is on the top or side wall of the housing.

In accordance with an aspect of the assembly, the air outlet includes directional vanes to enable the direction of air flow from the outlet to be selectively altered.

In accordance with an aspect of the assembly, the cup holder assembly is removable from the plane's cockpit, and includes a hook/hanger adapted to suspend the cup holder assembly from a panel member of the plane.

In accordance with an aspect of the assembly, the cup holder assembly includes an upwardly opening box. The upwardly opening box can be wider (from front to back) than the housing, such that the assembly includes an open space between the back wall of the housing and a back wall of the upwardly opening box. Alternatively, the housing and the upwardly opening box can be of the width.

In accordance with an aspect of the assembly, the cup holder assembly can be provided with a thermometer or thermocouple in thermal communication with an interior of the housing to indicate the temperature of the interior of the housing.

Briefly stated, a cup holder assembly is provided which allows for beverages to be cooled while operating a small agricultural aircraft. In the preferred embodiment, the attachment includes an exterior housing with a smaller interior housing enclosed therein and a ventilation duct. The smaller interior housing comprises an inlet to be connected to the aircraft's HVAC system to allow for beverages to be cooled. An attached exterior vent allows for ventilation for the cooled air.

BRIEF DESCRIPTION OF THE DRAWINGS

Corresponding reference numerals indicate corresponding parts throughout the several figures of the drawings.

DESCRIPTION OF THE PREFERRED EMBODIMENT

Figure 1:
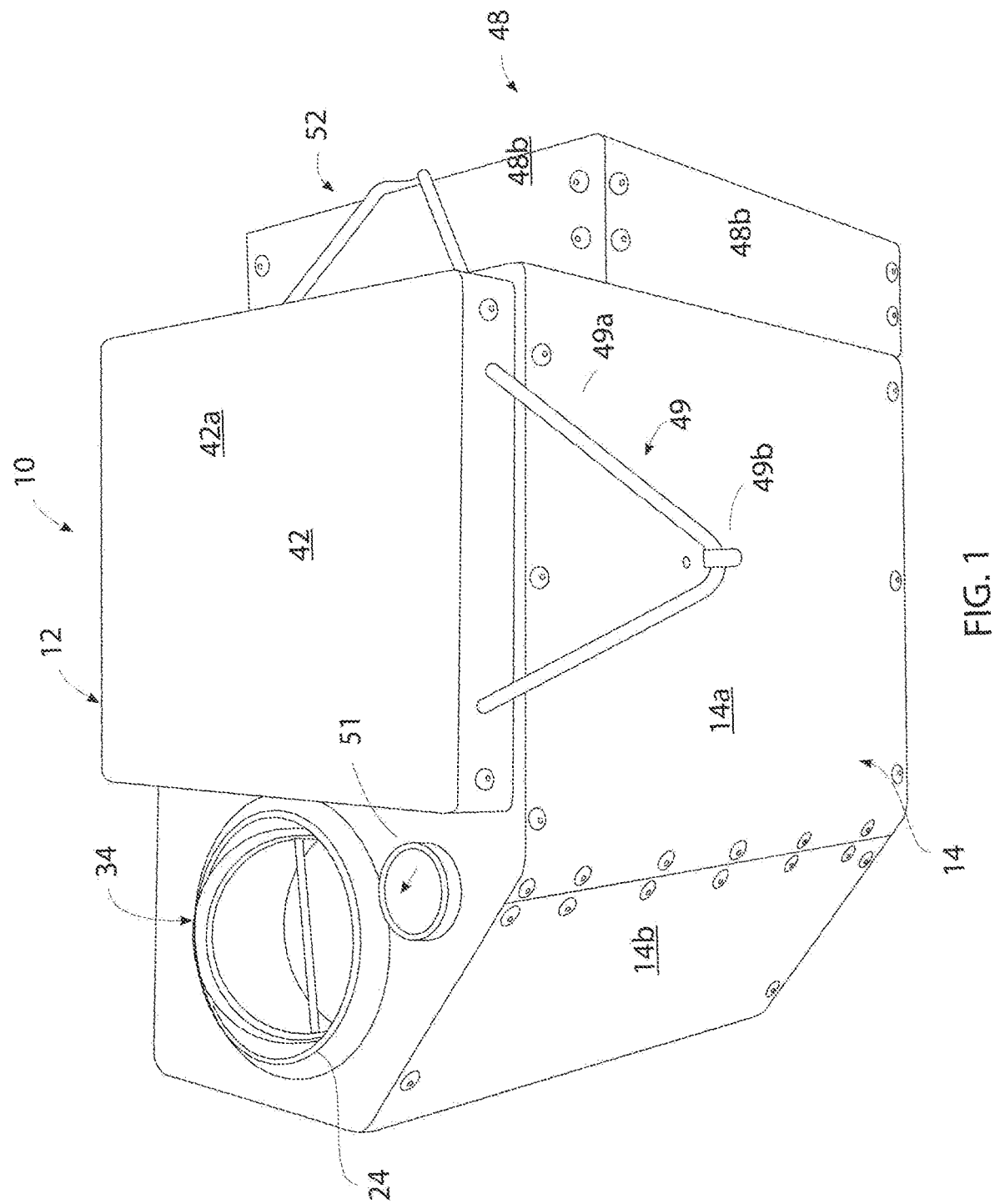
FIG. 1 is a front perspective view of a first illustrative embodiment of a cup holder assembly with a cover of the cup holder assembly in a closed position.

The following detailed description illustrates the claimed invention by way of example and not by way of limitation. The description clearly enables one skilled in the art to make and use the claimed invention, describes several embodiments, adaptions, variations, alternatives, and uses of the claimed invention, including what is presently believed to be the best mode of carrying out the claimed invention. Additionally, it is to be understood that the claimed invention is not limited in its application to the details of construction and the arrangement of components set forth in the following description or illustrated in the drawings. The claimed invention is capable of other embodiments and of being practiced or being carried out in various ways. Also, it is to be understood that the phraseology and terminology used herein is for the purpose of description.

A first illustrative embodiment of a cup holder assembly 10 is shown in FIGS. 1-5. As will be described, the cup holder assembly is adapted to be connected to the ducting of the plane's cooling system to keep, for example, beverages cool. The assembly 10 comprises a housing 12 having a front wall 14, a rear wall 16, a first side wall 18, a second side wall 20, a top 22, and a bottom 24. As seen, the front wall 14 includes a first portion 14a which is generally parallel to the back wall 16 and a second portion 14b which is angled relative to the front wall portion 14a. Hence, the first side wall 18 is shorter than the second side wall 20. The junction between the front wall portions 14a, 14b defines an imaginary line which divides the interior of the housing in to a beverage receptacle area 26 sized to receive a beverage container (such as a cup) and a ventilation area 28.

The housing is shown to include an inlet 30 in the bottom 24 of the ventilation area 28. As seen, the inlet 30 is in the form of a tube which is sized and shaped to be coupled to a hose of the plane's cooling system. Although not shown, the housing could include a coupler at the end of the inlet tube which will connect the inlet tube to the cooling system hose with a substantially airtight connection. Although the inlet is shown to be on the bottom of the housing, the inlet could be on either side wall, the front wall, or the back wall of the housing. The inlet could even be on the top of the housing. Additionally, the housing includes an outlet 34, in the form of a ventilation duct, in the top 22 of the housing. The outlet 34 could be configured such that air exits the housing generally vertically (i.e., generally perpendicularly to the top 22). Preferably, the ventilation duct is one which is angled, so that the air exiting the housing will be directed toward the pilot. The duct can even be rotatable, such that the pilot can aim the air exiting the housing in a desired direction. Although shown on the top, the outlet 34 could be positioned on either side wall, the front wall, or the rear wall of the housing.

The cup holder assembly 10 includes an opening 35 in the top 22 to allow for access to the beverage receptacle area 26. The opening 35 is shown to be round, but could be square, rectangular, or any other desired shape. If round, the opening 35 is sized to be larger than the diameter of the container (i.e., cup or bottle) which will be received in the cup holder. This helps stabilize the container in the cup holder without making it too difficult for a pilot to remove the container from the cup holder or to place the container in the cup holder. Additionally, if the opening 35 is only slightly larger than the container, the relatively close fit will reduce the amount of air that can escape from the housing around the container. The beverage receptacle area 26 includes a support 36 to support a beverage container BC within the housing above the bottom 24 of the housing. The support 36 includes a floor 38 upon which the beverage container (cup) BC sits and opposed arms 40 which support the floor 38 above the bottom 22 of the housing. The support 36 is shown to be relatively narrow. In this instance, the support 36 can be provided with a holder (such as a ring) to maintain the bottom of the cup in place relative to the support floor 38. The floor 38 could be wider, and could be generally circular in shape.

The housing 12 is preferably provided with a cover 42 which closes the opening 35. As shown, the cover 42 is rectangular in cross-section and defines a cover panel 42a and front, side, and back walls 42b, which, in combination, define a cover area 44 over the above the opening 35. This provides a space for the top of the beverage container BC to protrude into, such that the top of the beverage container BC will be above the top 22 of the housing. This will facilitate insertion and removal of the beverage container into the beverage receptacle area of the cup holder assembly 10. A gasket or seal 45 can be provided on the top surface 22 of the housing around the opening 35. The gasket 45 is positioned on the top surface 22 to seal with the cover 42 when in the closed position (as shown in FIG. 1) to form a substantially air tight seal between the housing 12 and the cover 42.

Figure 2:
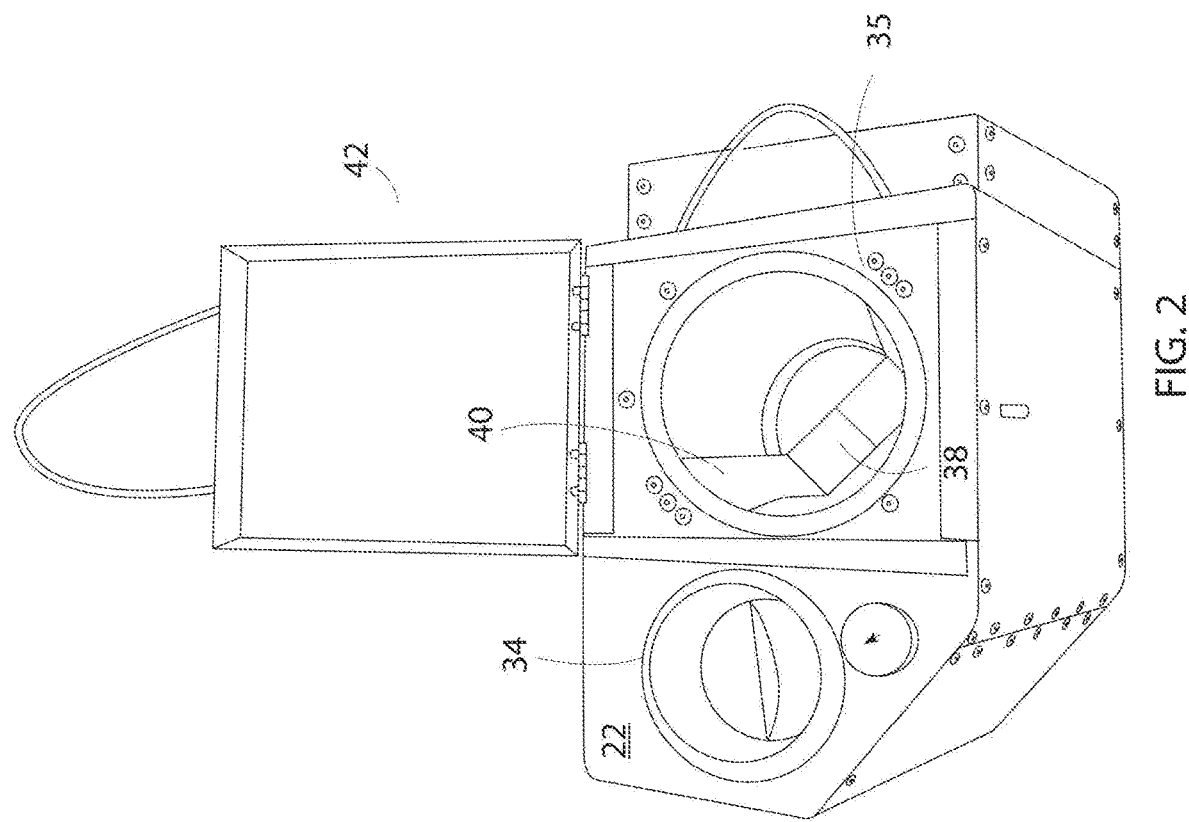
FIG. 2 is a top perspective view of the cup holder assembly of FIG. 1 with the cover of the cup holder assembly in an opened position.
Figure 3:
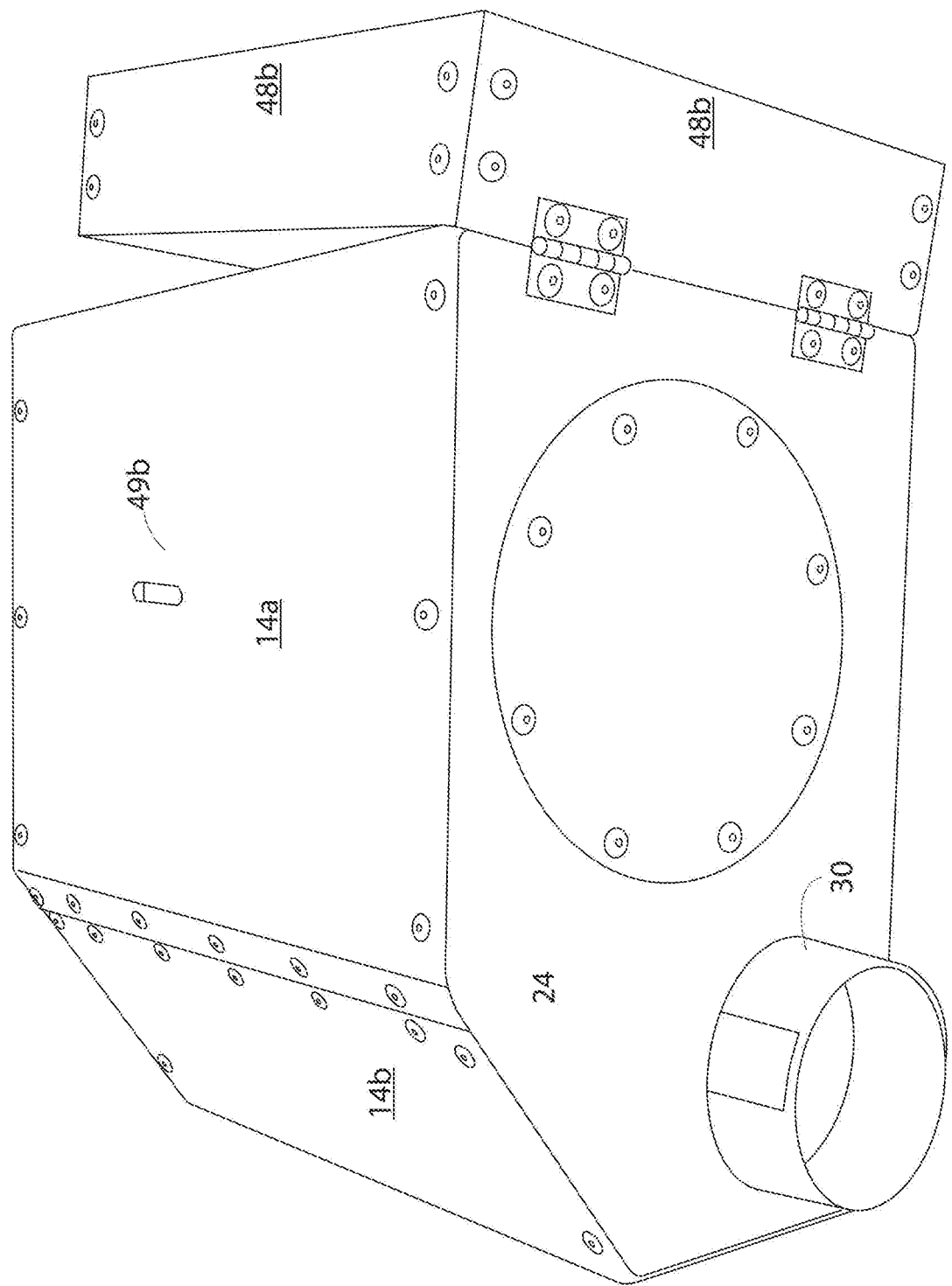
FIG. 3 is a bottom view of the cup holder assembly of FIG. 1, showing a side compartment of the assembly in a slightly opened position.

The cover 42 is preferably hingedly connected to the housing, to be pivotable between a closed position (FIG. 1) and an open position (FIG. 2). Additionally, the cover includes a locking mechanism 47 to keep the cover from inadvertently opening from the closed position. As shown, the locking mechanism comprises an elastic cord 47a connected at opposite ends to a wall 42b of the cover 42 and a hook 47b which opens downwardly to retain elastic cord 47a, as seen in FIG. 1. Any other desired locking mechanism can be used maintain the cover in the closed position. Alternatively, the cover can be held closed by a friction fit, or by a ball and detent. As another alternative, the cover could be threadedly secured to the housing.

The cup holder assembly 10 can include a second compartment 46 which can be sized to hold a sandwich, snack, etc. This second compartment is defined by the second side wall 20 and a cover 38 which is mounted to the housing to be movable between an open and a closed position. The cover 48 comprises an outer surface 48a and side walls 48b which space the surface 48a from the housing wall 20. The cover 48 can be hingedly connected to the housing, for example at a bottom of the cover, so that the cover opens downwardly, as shown, for example, in FIGS. 3 and 4. If provided with the second compartment, an opening 50 can be formed in the side 20 of the housing to enable the second compartment 46 to communicate with the interior of the housing 10, such that cooled air can circulate into the second compartment. Although the opening is shown as a single hole, the opening 50 could be formed as a plurality of perforations, or the single opening could, for example, be screened. Having a screened opening, or a plurality of openings, will reduce the possibility of contents from passing from the second compartment into the beverage receptacle area. The housing is preferably made of metal, and thus readily conducts heat. The opening 50 could be omitted, and second compartment 46 will be cooled by conduction through the wall 20 of the housing. The cover 48 is held closed by a locking mechanism 52 which can be identical to the locking mechanism 47.

Figure 4:
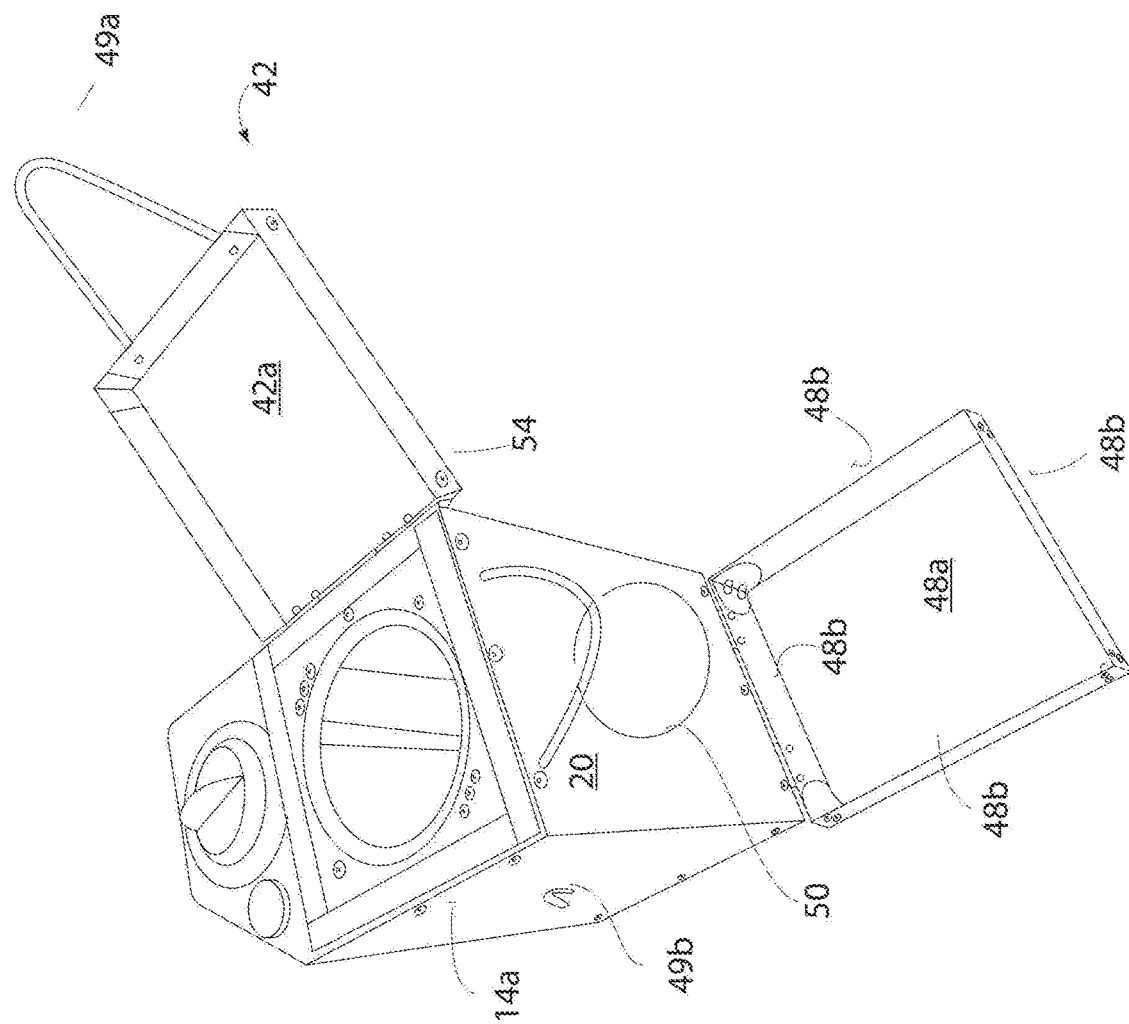
FIG. 4 is a side perspective view of the cup holder assembly of FIG. 1 showing a side compartment and the lid of the beverage compartment of the cup holder assembly in an opened position.

As seen in FIG. 4, the inner (or under) surface of the cover panel 42a is insulated. Additionally, the inner surfaces of the housing walls can also be insulted.

Figure 5:
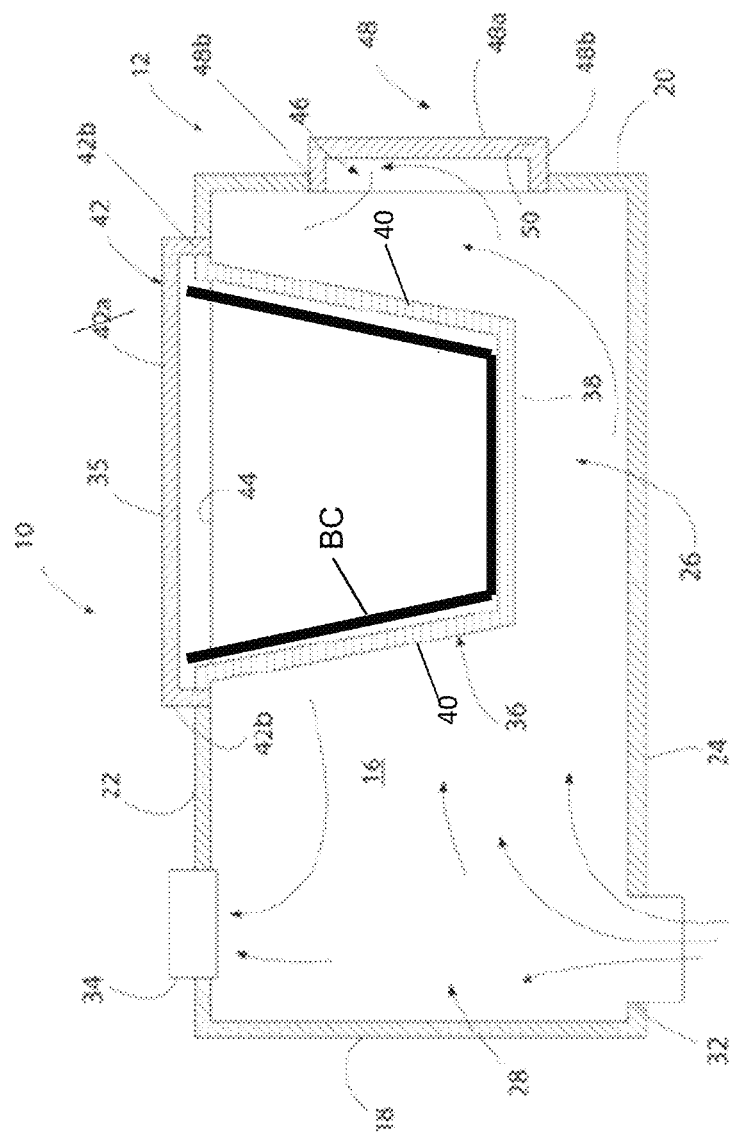
FIG. 5 is a schematic cross-sectional view of the cup holder assembly of FIG. 1

With reference to FIG. 5, cooled air will be vented into the housing 10 through the inlet 30. The cooled air will circulate within the housing, around the cup, and into the second compartment (if the housing is provided with the opening 50) to maintain the beverage within the cup holder and any snack contained in the second compartment cool. The air will then exit the housing 10 through the outlet 34 to be directed by the outlet vent in a desired direction. Although the inlet 30 is shown to be offset from the cup support 36, the inlet 30 could be positioned to be directly below the cup support 36.

Through testing, I have found that the cup holder assembly 10 will keep a beverage cool for extended periods of time. A thermometer (or thermocouple) 51 placed on the housing has shown that the interior of the housing can be cooled to, and maintained at, 38° F. (about 3° C.). The thermometer 51 is not necessary, but can be used as an indicator of the functioning of the plane's air conditioning system. If the cooling system ceases to maintain the interior of the housing at, for example, 38° F., there may be a problem with the plane's air conditioning system.

The cup holder assembly 10 is removable. Crop dusters include a map pocket on one of the side walls of plane's cockpit. As is known, such a map pocket is defined in part by a panel spaced from the side wall of the cockpit. The cup holder assembly 10 includes a hook 54 on the back wall 16 which can receive the top edge of the map pocket panel. The hook 54 can comprise an elongate strip defining a downwardly opening channel. Alternatively, the hook 54 can be defined by two or more discrete hook members. As such, the cup holder assembly 10 can simply be hung or mounted on the panel of the map pocket. Alternatively, if the plane has a flange rather than a pocket attached to the wall of the plane's cockpit, the cup holder assembly can be suspended from such a flange by the hook 54.

The housing 10 and the covers 42 and 48 are illustratively made of sheet metal, for example, aluminum. However, housing 12 and covers 42, 48 can be made of any desired material which will withstand the use to which the cup holder assembly will be put. To this end, the cup holder assembly could be made from plastic, wood, or any other desired material. If made from plastic, the housing 12 and the covers 42, 48 can be formed in a molding operation.

Figure 6:
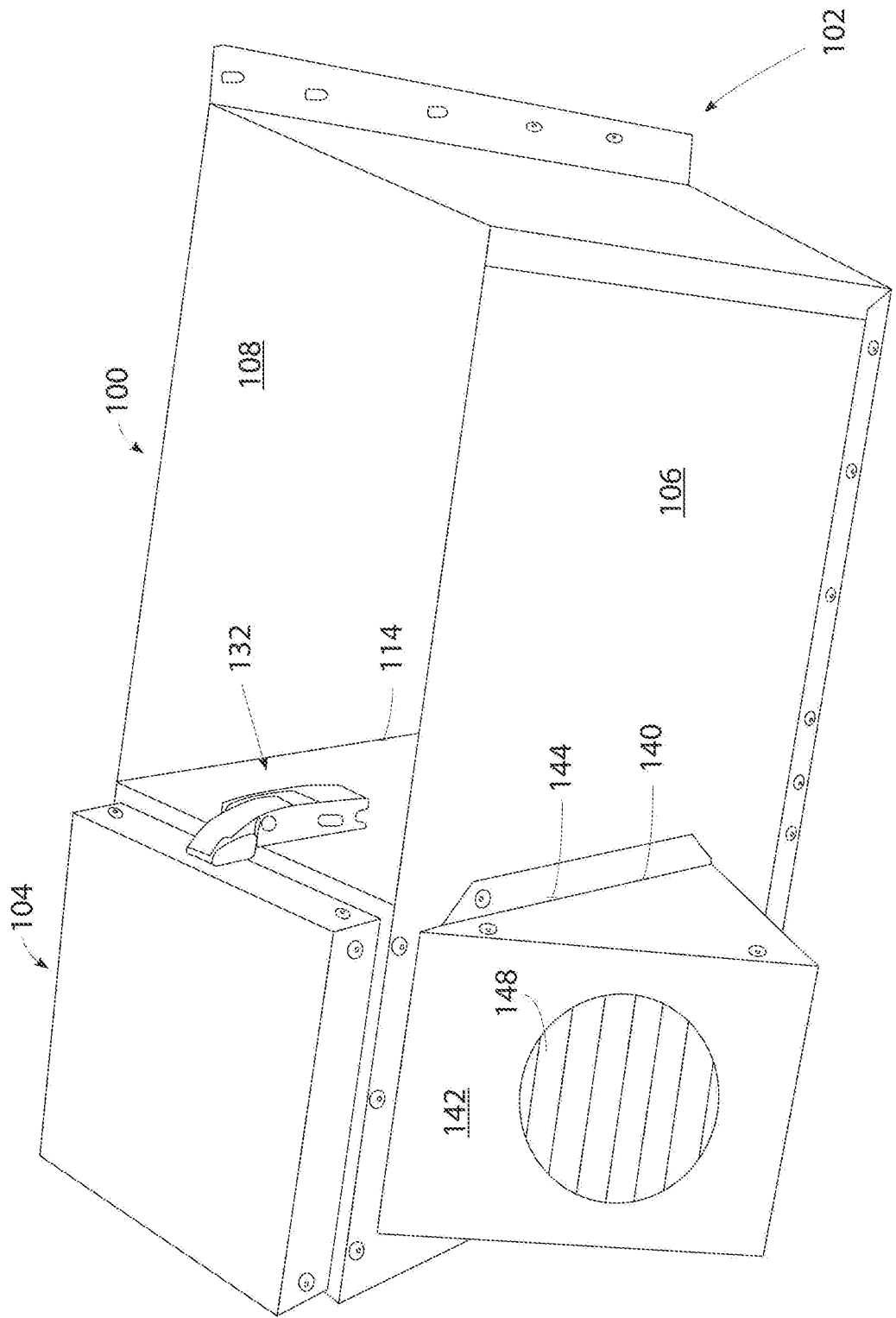
FIG. 6 is a top perspective view of a second illustrative embodiment of the cup holder assembly with a cover of the cup holder assembly in a closed position.
Figure 7:
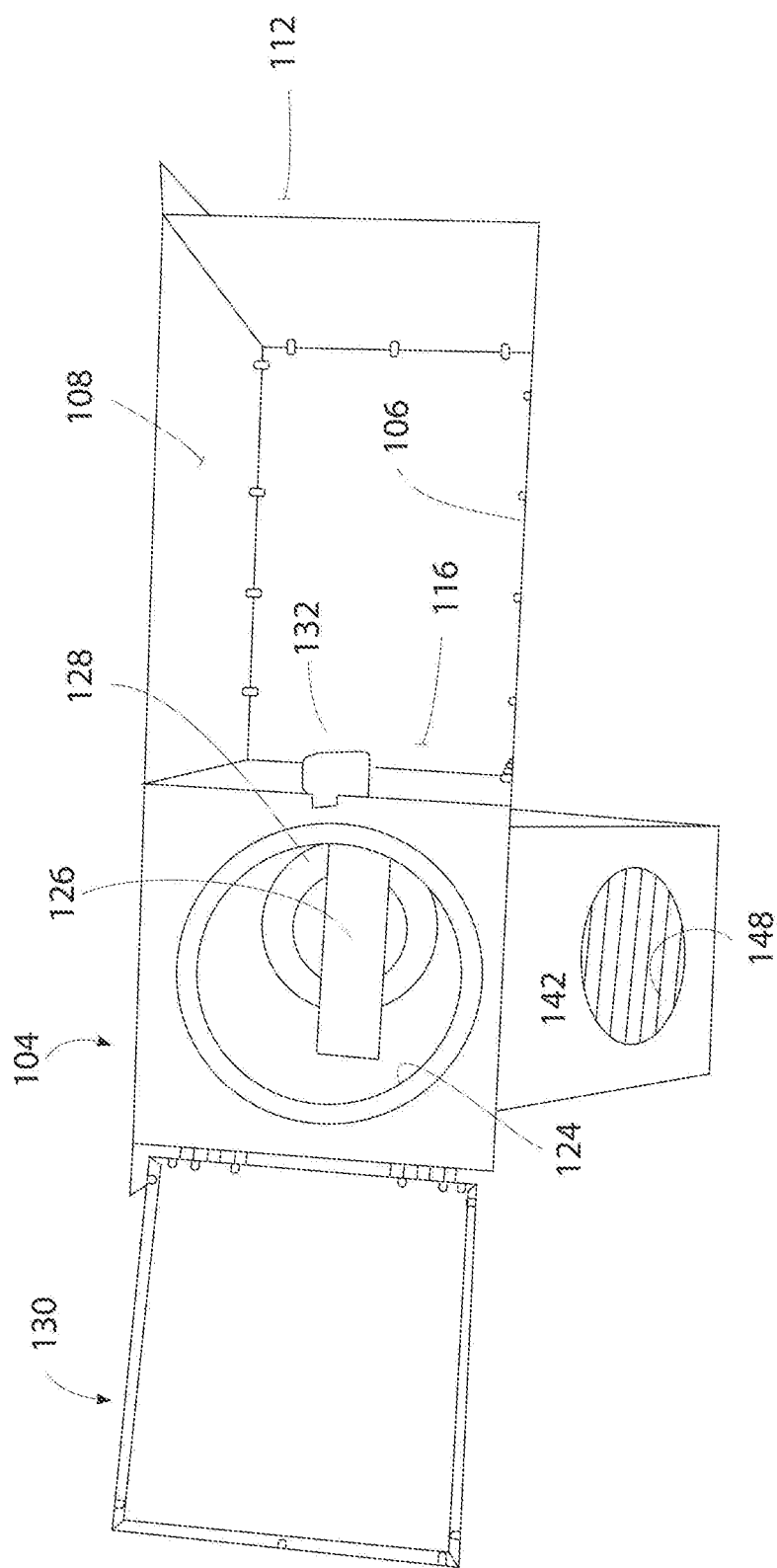
FIG. 7 is a view similar to FIG. 6, but with the cover in an opened position.
Figure 8:
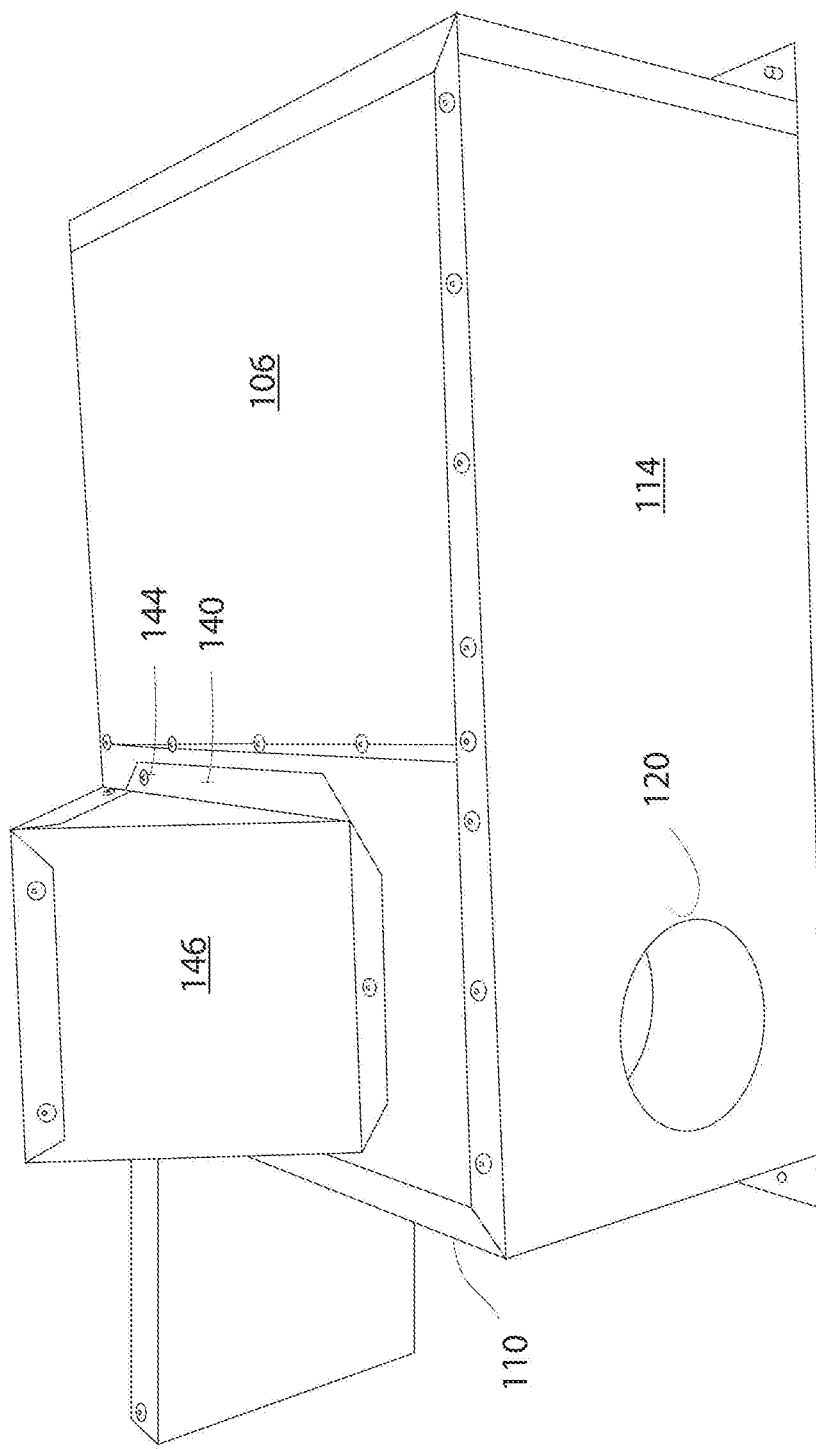
FIG. 8 is bottom perspective view of the cup holder assembly of FIG. 6.

An alternative embodiment is shown in FIGS. 6-8. The cup holder assembly 100 is designed to replace the plane's map pocket or to be used when the plane does not have a map pocket. Thus, as seen FIGS. 6-8, the assembly 100 includes an upwardly opening box 102 with a housing 104 at one end thereof. The assembly 100 includes a front wall 106, a rear wall 108, a first side wall 110, a second side wall 112, and a bottom 114. A dividing wall 116 extends between the front and back walls. The open box 102 is defined by the bottom, front wall, back wall, divider, and second side wall; and the housing 104 is defined by the bottom front wall, back wall, first side wall, and divider. Thus, in the embodiment shown, the housing 104 has a depth equal to that of the open box 102. The assembly 100 is secured in the plane by means of fasteners (such as bolts or screws) which pass through the back wall 108 of the assembly into a side panel of the plane's cockpit.

With reference to FIG. 8, the housing 104 includes an inlet 120 in the bottom 114 which opens into the interior of the housing 104. The inlet 120 can be provided with a tube, as in the cup holder assembly 10, to facilitate coupling of the assembly 100 to the plane's air cooling system.

The housing 104 includes a top surface 122 defining an opening 124 to allow access to the interior of the housing. A cup support 126, in the form of a strip, extends between opposed walls of the housing beneath the opening 124. The support 126 is spaced above the inlet 120. The cup support 126 further includes a ring 128 which will help maintain the position of the cup on the support 126. The cup support 126 could alternatively be a larger sheet which could be provided with the ring 128 or other positioners to help maintain the position of a beverage container on the sheet. An insulated cover 130, substantially similar to the cover 42 of the assembly 10, is provided to close the housing 104. The cover 130 is preferably hingedly connected to the housing, but as noted above, can be connected to the housing in any desired manner which will allow the cover to be moved between closed position and an opened position. The hinged cover is shown in FIGS. 6 and 7 to include a locking mechanism 132 in the form of a latch which will maintain the cover 130 in its closed position, and which can be released to open the cover to access the interior of the housing.

The housing 104 includes an outlet 140 through which cooled air can exit the housing to cool the air in the plane's cabin. Unlike the assembly 10, the outlet 140 is on the front wall 106 of the assembly 100. The outlet 140 comprises an outlet surface 142 which slopes outwardly and downwardly from the top edge of the front wall 106 of the housing 104. Two triangular side walls 144 and a bottom wall 146 complete the outlet. An outlet opening or vent 148 in the outlet surface 142 directs air upwardly and away from the housing (and preferably toward the pilot). The opening or vent 148 can be provided with louvers to further direct the flow of air. Further, such louvers can be movable (i.e., pivotable) to allow the pilot to selectively alter the angle of the flow of air exiting the housing 104 relative to the surface 142 of the outlet. Further, the vent 148 can be rotatable (similarly to the vent in the assembly 10) to allow for further control of the direction of air flow exiting the housing 104. Although not shown in the figures, the assembly includes an opening in the front wall of the housing 104 to allow air to pass from the inlet, through the housing, and out the outlet 140. In the housing 104, the inlet 120 is generally centered below the opening 124 in the top surface 122, and is thus at least in part directly below a beverage container placed in the housing. The support 126 is thus spaced above the bottom 114 so that the cup will not block the inlet.

Figure 10:
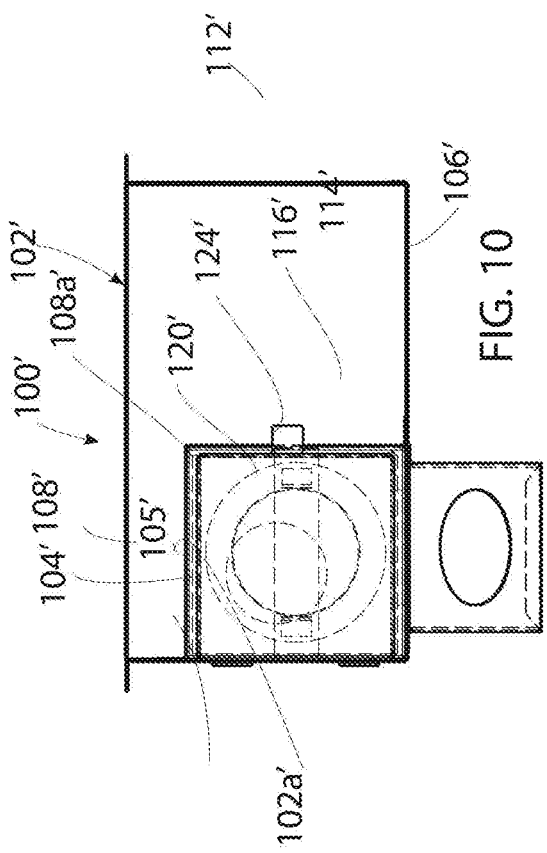
FIG. 10 is a top plan view of the cup holder assembly of FIG. 9.
Figure 9:
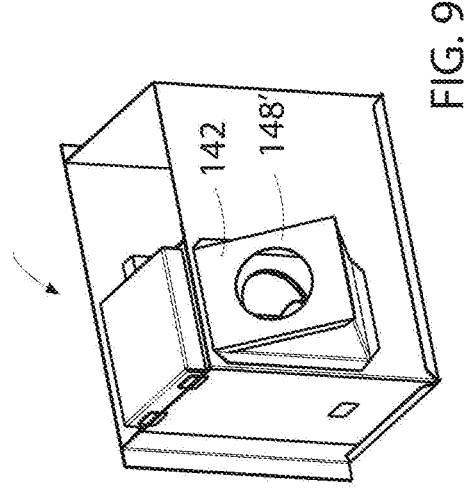
FIG. 9 is a top perspective view of a variation of the cup holder assembly of FIG. 6.
Figure 12:
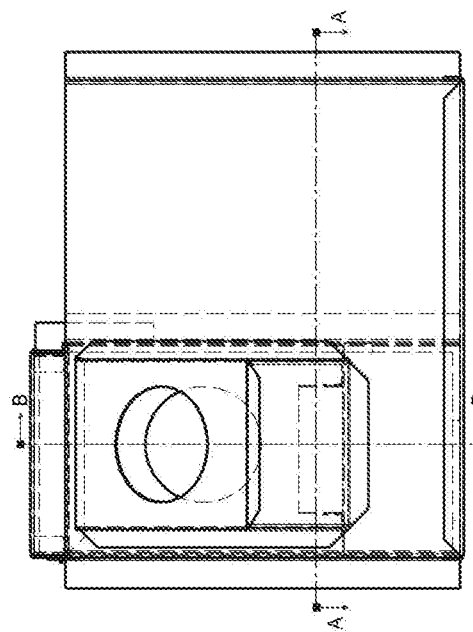
FIG. 12 is a bottom plan view of the cup holder assembly of FIG. 9.
Figure 11:
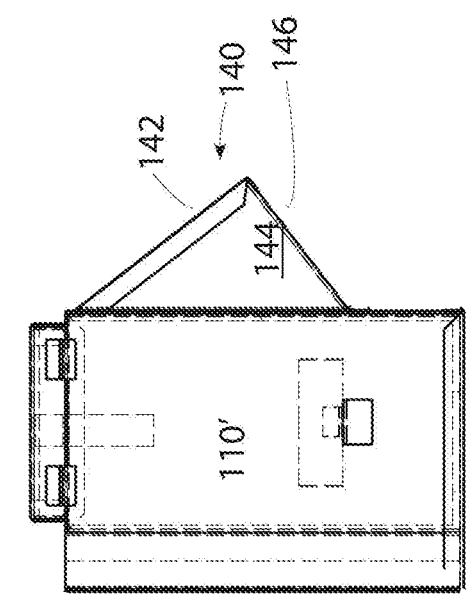
FIG. 11 is a side elevational view of the cup holder assembly of FIG. 9.

A variation of the assembly 100 is shown in FIGS. 9-12. The assembly 100' differs from the assembly 100 primarily in that it includes a wider box 102'. That is, the upwardly opening box 102' is wider than the housing 104', and thus, there is an open space 105 between the back wall 108a of the housing and the back wall 108' of the assembly 100'. Also, as can be seen in FIG. 10, the inlet 120 is offset from the top opening 124'. The assembly 100' can be shorter than the assembly 100, and still allow for a map to be positioned lengthwise space behind the housing 104'. As can be appreciated, the divider 116' does not extend the full width of the assembly 100'. Hence, the back wall of the housing 104 is defined by a panel 102a' which is spaced from the back panel 102' of the assembly 100'. Further, as seen in FIG. 10, the inlet 120' is below the top surface opening 124', but is offset from the opening 124'. Hence, the inlet and the opening are not axially aligned.

As can be appreciated, the cup holder assemblies 10, 100, and 100' provide housings which can be connected to a plane's cooling system to redirect cooled air to maintain a beverage cool for extended periods of time, without affecting the cooling of the cockpit. The assemblies then vent the air toward the pilot. Although the cup holder assemblies have been described for use inside of crop duster, it will be apparent that the cup holder assemblies can be used with other vehicles.

As various changes could be made in the above constructions without departing from the scope of the invention, it is intended that all matter contained in the above description or shown in the accompanying drawing shall be interpreted as illustrative and not in a limiting sense. For example, although the inlet is shown to be in the bottom of the assemblies, the inlet could be in side wall or back wall of the assemblies. In the assemblies 100 and 100', a second compartment could be provided as in the assembly 10 to keep snacks or sandwiches cool. Such a second cooled compartment could be significantly longer than the second compartment of the assembly 10, and would only be limited by the length of the box 102. These examples are merely illustrative.

What is claimed is:

1. A passively cooled cup holder assembly comprising:
    a housing comprising a front wall, a back wall, side walls, a bottom surface extending between bottom edges of said front, back, and side walls, and a top surface extending between top edges of said front, back, and side walls; said front wall, back wall, side walls, and top and bottom surfaces defining a beverage receiving area; the top surface defining an access opening into the beverage receiving area, said access opening defining an area smaller than an area of said top surface;
    a beverage cover connected to said top surface to be moveable between a closed position in which said access opening is closed and an open position in which said access opening is open and accessible; said beverage cover comprising a cover front wall, a cover back wall, cover side walls, and a cover top; whereby said cover defines a cover volume above said top surface of said housing;
    a support positioned within beverage receiving area adapted and configured to support a beverage container in an upright position above the bottom of the housing; the support being positioned in said housing such that said beverage container, when received in said support, extends through said access opening such that at least a portion of said beverage container is above the top surface of said housing to be within said cover volume when said beverage cover is closed, whereby said container is graspable from above said housing top surface when said beverage cover is in said opened position;
    an air inlet and an air outlet, each of said air inlet and air outlet being positioned on one of said front wall, back wall, side walls, top surface or bottom surface; said air inlet and air outlet both being in communication with said beverage receiving area; whereby, cooled air which enters through the air inlet will circulate around a beverage container received in the housing, and will then exit the housing through the air outlet;
    said cup holder assembly further comprising a second compartment; said second compartment being defined by one of said walls of said housing and by a second cover, whereby said second compartment is adjacent to, but separated from, said beverage containing area; said housing comprising an opening in said one of said walls, such that said second compartment is in communication with said beverage receiving area whereby cooled air which enters the housing will enter the second compartment; said second cover comprising an outer surface and being pivotable about an axis between a closed, raised, position in which said outer surface of said cover is generally parallel to said one of said side walls of said housing and an opened, lowered, position in which said cover extends away from said one of said side walls of said housing; said axis being below said opening in said one of said side walls; said second compartment and said second cover being positioned such that said second cover is movable from its closed to its open position when the beverage cover is closed.

2. The passively cooled cup holder assembly of claim 1 wherein at least one of the beverage cover walls and/or the beverage cover top surface are insulated.

3. The passively cooled cup holder assembly of claim 1 wherein the air outlet is on the top or side wall of the housing.

4. The passively cooled cup holder assembly of claim 3 wherein the air outlet includes directional vanes to enable the direction of air flow from the outlet to be selectively altered.

5. The passively cooled cup holder assembly of claim 1 further including a hook/hanger adapted to suspend the cup holder assembly from a panel member.

6. The passively cooled cup holder assembly of claim 1 further comprising:
    a box adjacent said housing, said box being opened at a top thereof and comprising a front wall, a back wall, and end walls; wherein said front wall of said housing is coplanar with said front wall of said box, and a side wall of said housing defines at least a portion of one of said walls of said box; and wherein said housing is fixed in place relative to said box;
    and wherein said passively cooled cup holder assembly is adapted to be mounted in a vehicle to be accessible during operation of the vehicle.

7. The passively cooled cup holder assembly of claim 6 wherein the box has a front-to-back width greater than a front-to-back width of the housing, such that the assembly includes an open space between said back wall of said housing and said back wall of said box such that said box defines an L-shaped compartment.

8. The passively cooled cup holder assembly of claim 6 wherein said housing has a front-to-back depth equal to a front-to-back depth of said box, whereby said back wall of said housing is coplanar with said back wall of said box, and said side wall of said housing defines one of said end walls of said upwardly opening box.

9. The passively cooled cup holder assembly of claim 1 wherein the inlet is in the bottom surface of said housing.

10. The passively cooled cup holder assembly of claim 9 wherein said inlet is horizontally spaced from said access opening, such that said inlet is not centered below the beverage container when the beverage container is placed in the beverage containing area.

11. The passively cooled cup holder assembly of claim 10 wherein said inlet is offset from said access opening.

12. The passively cooled cup holder assembly of claim 9 wherein said inlet is positioned to be below said beverage container when placed in the beverage containing area.

13. The passively cooled cup holder assembly of claim 1 further including a thermometer in thermal communication with an interior of the housing to indicate the temperature of the interior of the housing.

14. The passively cooled cup holder assembly of claim 1 wherein an area defined by said beverage cover is smaller than an area defined by the top surface of said housing.

15. The passively cooled cup holder assembly of claim 1 wherein said cover of said second compartment is hingedly connected to said one of said walls of said housing such that said cover of said second compartment pivots downwardly when moved from said closed position to said open position.

16. The passively cooled cup holder assembly of claim 1 wherein said second cover comprises cover side walls and said outer surface; said second compartment being defined by said one of said side walls of said housing and said second cover.

17. The passively cooled cup holder of claim 16 wherein the second compartment is sized to hold a sandwich.

\* \* \* \* \*